United States Patent [19]

Johnson, Jr. et al.

[11] Patent Number: 4,935,861
[45] Date of Patent: Jun. 19, 1990

[54] UNINTERRUPTED POWER SUPPLY HAVING NO LOW FREQUENCY POWER MAGNETICS

[75] Inventors: Robert W. Johnson, Jr.; William J. Raddi; George W. Oughton, all of Raleigh, N.C.

[73] Assignee: Exide Electronics, Raleigh, N.C.

[21] Appl. No.: 366,098

[22] Filed: Jun. 13, 1989

[51] Int. Cl.⁵ .......................................... H02M 3/335
[52] U.S. Cl. ..................... 363/132; 363/37; 363/41; 363/98; 307/46; 307/66
[58] Field of Search ............. 363/37, 41, 98, 132; 307/46, 48, 64, 66, 86, 87

[56] References Cited

U.S. PATENT DOCUMENTS

| | | | |
|---|---|---|---|
| 4,246,633 | 1/1981 | Borkovitz | 363/37 |
| 4,626,979 | 12/1986 | Jaquay | 363/98 |
| 4,638,176 | 1/1987 | Martinelli | 307/66 |
| 4,706,180 | 11/1987 | Wills | 363/98 |

Primary Examiner—Peter S. Wong
Attorney, Agent, or Firm—Woodcock Washburn Kurtz Mackiewicz & Norris

[57] ABSTRACT

An uninterrupted power supply (UPS) systems is provided comprising a rectifier circuit, an inverter circuit and a battery boost circuit. One of the input terminals of the rectifier circuit is for connection to the ungrounded conductor of an AC power source and the other input terminal of the rectifier circuit is for connection to the grounded conductor of the AC power source. The UPS has a pair of load terminals for connection to a load. The input terminal of the rectifier circuit for connection to the grounded conductor is connected to one of the pair of load terminals by an electrical conductor whose electrical continuity is maintained from this input terminal to the one of the pair of load terminals without any isolation device such as a 50 or 60 Hz transformer being disposed between the input terminal and the one of the pair of load terminals.

6 Claims, 1 Drawing Sheet

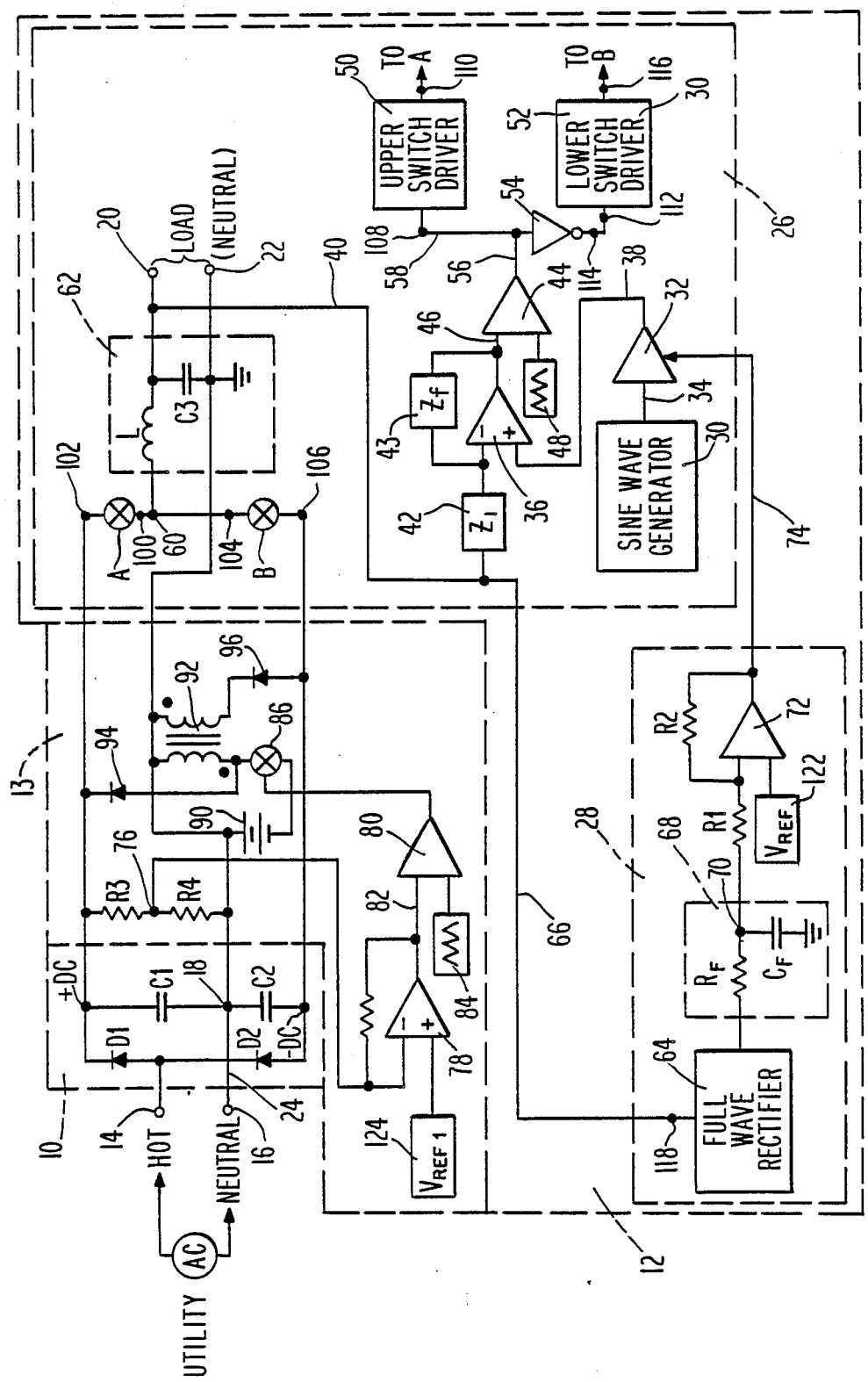

4,935,861

UNINTERRUPTED POWER SUPPLY HAVING NO LOW FREQUENCY POWER MAGNETICS

BACKGROUND OF THE INVENTION

This invention relates to the field of emergency power sources. More particularly, the invention relates to a so-called UPS (uninterrupted power supply) system.

UPS systems are used as a sort of buffer between ordinary commercial alternating-current (AC) utility power and critical components such as computers, so that if the line voltage varies or is interrupted, power to the load is maintained at adequate levels or is not lost. The traditional UPS system is typically comprised of a rectifier, inverter and battery charger. It may be explained here, that in order to eliminate shock hazards, it is required that the neutral line or conductor from ordinary commercial AC utility power be grounded. Because of the inherent nature and mode of operation of typical UPS systems, the integrity of the neutral is destroyed as the AC power is processed by the UPS. In a typical UPS system, AC power supplied to the UPS is full-wave rectified which destroys the integrity of the neutral conductor. In order to re-establish the integrity of the neutral conductor, some type of isolation means is required in the UPS system. Typically such isolation means takes the form of a 50 or 60 Hz transformer.

With the increasingly widespread development and use of smaller, less expensive computers, there has been an increasing emphasis on the development of smaller and less expensive UPS systems. A significant contributor to the overall cost, weight and size of UPS systems is the 50 or 60 Hz transformer. Thus, there is a need in UPS systems to maintain the integrity of the neutral conductor of the AC utility power, as well as the need to eliminate the 50 or 60 Hz transformer thereby actually reducing the overall cost, size and weight of such UPS systems.

BRIEF SUMMARY OF THE INVENTION

The present invention provides a UPS system in response to, and in satisfaction of, the aforementioned need. Basically, apparatus in accordance with the invention is designed to have many of the traditional features of currently available UPS systems without their associated cost, size and weight.

Briefly, and in accordance with the invention, there is provided an uninterrupted power supply system comprising rectifier means for effecting rectification of alternating-current utility voltage to obtain direct current voltage. The rectifier means has a first input terminal for connection to the ungrounded conductor of an alternating-current utility power source and a second input terminal for connection to the grounded conductor of the alternating-current utility power source. The uninterrupted power supply system further includes a pair of load terminals for connection to a load. The second input terminal of the rectifier means is connected to one of the pair of load terminals by an electrical conductor whose electrical continuity is maintained from the second input terminal to the one of the pair of load terminals and without any isolation means being disposed between the second input terminal and the one of the pair of load terminals. The uninterrupted power supply system further includes inverter means for conversion of the direct current voltage produced by the rectifier means to alternating current voltage and for maintaining the level of the alternating-current voltage across the pair of load terminals in a desired range under normal conditions wherein the voltage of the alternating-current utility power source is in a predetermined range above or below a desired level.

A more complete understanding of the invention will be had upon consideration of the ensuing specification, particularly when considered in light of the appended drawings, directed toward a particular embodiment of the invention.

BRIEF DESCRIPTION OF THE DRAWINGS

The Figure represents a schematic diagram of the UPS systems in accordance with the invention.

DESCRIPTION OF THE PREFERRED EMBODIMENT

Referring to the Figure, there is shown a schematic diagram of the UPS system of the invention. The diagram is divided by dashed lines or blocks into large functional sections which can be broadly characterized as rectifier means 10, inverter means 12, and battery boost circuit means 13.

Utility power or AC is supplied from ordinary commercial circuitry to first and second input terminals 14 and 16, respectively, of rectifier 10 with terminal 14 being designated as "HOT" and terminal 16 being designated as "NEUTRAL". The hot terminal 14 is connected to the ungrounded conductor of the AC utility power source and the neutral terminal 16 is connected to the grounded conductor of the AC utility power source. The utility AC voltage is rectified to obtain direct current (DC) voltage by diodes D1 and D2 of rectifier 10 in conventional fashion to obtain direct current voltage, as will be understood to those skilled in the art, producing a +DC voltage at a first output terminal labeled +DC in the Figure and a −DC voltage at a second output terminal labeled −DC in the Figure and across a first capacitor C1 and second capacitor C2, respectively, with respect to the neutral point 18. The DC is then processed by the inverter 12 to produce a sine wave at the pair of load terminals 20 and 22, as will be explained more fully hereinafter. From the foregoing, however, it will be understood that the rectifier means 10 produces rectified line +DC voltage across capacitor C1 and produces rectified line −DC voltage across the capacitor C2, respectively, with respect to the node 18 shown in electrical conductor 24 when the first and second input terminals 14, 16 are connected, respectively, to the ungrounded conductor and grounded conductor of the alternating-current utility power source. It will be noted at this point, however, that the electrical conductor 24 extends or passes through the UPS system without interruption from the input terminal 16 to the load terminal 22 and, therefore, load terminal 22 is at the same voltage as point 18, i.e., neutral or at ground potential. It will be noted, however, that a current sensing resistor (not shown) of approximately 0.1 ohms may be inserted into conductor 24 for monitoring the load current; such a current sensing resistor, of course, will not interrupt the electrical continuity of the conductor 24. It will be further noted that the electrical continuity of electrical conductor 24 is maintained from the input terminal 16 to the load terminal 22 and without any isolation means, e.g., low frequency power magnetics or a transformer, being disposed between terminal 16 and terminal 22.

Continuing with the description of the UPS system in accordance with the invention and in particular to the inverter 12, inverter 12 is comprised of two main sections, namely, that portion shown essentially within block 26 and the remainder of the circuitry disposed essentially within block 28. Broadly, inverter 12 converts the direct current voltage produced by the rectifier means 10 to alternating current voltage and, as will be explained more fully below, maintains the level of the alternating-current voltage across the pair of load terminals 20, 22 in a desired range (±3% of 120 V) under normal conditions wherein the voltage of the utility power source is in a predetermined range (+13% to −20% of 120 V) above or below a desired level (120 V).

That portion of the inverter 12 shown in block 26 essentially comprises a control circuit for effecting the opening and closing of a suitable first switching element A and a suitable second switching element B whereby to convert the DC voltage produced by the rectifier 10 to AC voltage across the pair of load terminals 20 and 22. The first switching element A has a first terminal 100 and a second terminal 102 coupled to the +DC output terminal of rectifier 10. The second switching means B has a first terminal 104 coupled to the first terminal 100 of switching element A and a second terminal 106 coupled to the second output terminal or −DC terminal of rectifier means 10.

That portion of inverter 12 shown in block 26 operates as follows: A sinusoidal reference voltage waveform or signal representative of the desired voltage waveform across terminals 20, 22 is produced by a sine wave generator 30. The output of sine wave generator 30 is coupled to a variable gain amplifier 32. The sine wave signal produced by the sine wave generator 30 is fed to the input of variable gain amplifier 32 via lead 34. As will be explained more fully hereinafter, the gain of variable gain amplifier 32 is controlled by the circuitry disposed in block 28 and the variable gain amplifier 32 generates a voltage signal representative of the voltage appearing at output load terminal 20. The output of the variable gain amplifier 32 is coupled to one input terminal of an error signal generating means or a main error amplifier 36 via lead 38. The other input of main error amplifier 36 is coupled to load terminal 20 via lead 40 and input impedance $Z_1$ represented by block 42 and derives a voltage signal proportional to the voltage appearing at load terminal 20. In the main error amplifier 36, the output signal of variable gain amplifier 32 is compared to the voltage at load terminal 20. The main error amplifier 36 provides or produces an error voltage signal at its output representative of the error or difference between the two signals applied to its input. The output of the main error amplifier 36 is coupled to both its input via feedback impedance $Z_f$ represented by block 43 and to one input of a pulse width modulation means or comparator 44 via lead 46, and the error signal appearing on the output of main error amplifier 36 is applied via lead 46 to this input of comparator 44. The other input of comparator 44 has applied thereto a signal having a triangular waveform, generated by reference waveform-generating means 48, of a desired carrier frequency, i.e., the frequency at which the switching elements A and B are to be switched from one state to another. The switching signal appearing on the output of the comparator 44 is a pulse train or pulse width modulated (PWM) waveform voltage signal, i.e., the error signal fed into the comparator 44 controls or modulates the triangular waveform 48 to produce the PWM waveform signal.

The comparator 44 is directly coupled to first upper leg or switch driver means 50 and to second lower leg or switch driver 52 via not device 54. The first driver 50 has an input 108 coupled to the output of comparator 44 and an output 110 coupled to the first switching means A. The second driver 52 has an input 112 coupled to the output 114 of not device 54 and an output 116 coupled to switching means B. The PWM signal appearing at the output of comparator 44 is applied directly to upper leg or switch driver 50 via leads 56 and 58 and to lower leg or switch driver 52 via lead 56 and not device 54. The combination and operation of the upper leg driver 50 and not device 54 and lower leg driver 52 causes switches A and B to alternately open and close according to the presence or absence of a switching signal on the output of the comparator 44, i.e., switching element A is on or conducting when switching element B is off and vice versa.

By this switching action of switching elements A and B, the PWM waveform output voltage signal of comparator 44 is duplicated at node 60 and is processed by low pass filter 62 comprised of filter inductor means or element L, which is coupled to the first terminals 100 and 104 of switching means A and B, respectively, and to output load terminal 20, and filter capacitor means or element C3, which is coupled to the inductor L and across load terminals 20 and 22. The resultant voltage waveform at output terminal 20 is a facsimile of the output signal of variable gain amplifier 32 at the desired output load voltage. Stated another way, as the voltage at output load terminal 20 decreases then a larger error signal would be provided on the output of main error amplifier 36. This larger error signal would then be applied to comparator 44 resulting in a corresponding change in the PWM waveform output voltage signal such that output load terminal 20 is restored to the regulated value, i.e., the desired value, typically 120 volts and 60 Hz.

As will be understood to those skilled in the art, the purpose of the portion of the inverter 12 disposed within block 26 is to essentially replicate the waveform of the output signal of sine wave generator 30 in magnified form; i.e. 120 V at output load terminal 20 such that variations in output voltage across the load terminals 20, 22 caused by load current voltage drops due to impedances in the inverter circuitry are compensated for by the variable gain amplifier 32 increasing its output thereby effecting regulation of the voltage across terminals 20, 22 as will be further understood with reference to block 28.

The remaining portion of inverter 12, i.e, that portion in block 28 operates as follows: the voltage at output load terminal 20 is applied to the input 118 of full wave rectifier 64 via leads 40 and 66 and, of course, is rectified thereby. The output of full wave rectifier 64 is averaged by averaging means or low pass filter 68 comprised of resistor $R_F$ and capacitor $C_F$ resulting in a D.C. voltage at node 70. The voltage at node 70 is representative of the voltage appearing at output load terminal 20 and is compared to $V_{REF}$ in error amplifier 72. $V_{REF}$ is generated by reference generator 122 and is proportional to the desired voltage level of 120 V. The gain of error amplifier 72 is determined and established by the values of resistors R1 and R2. The voltage output signal or error signal of error amplifier 72 is the gain of error amplifier 72 times the difference of voltage between node 70 and $V_{REF}$. This error signal is fed to variable gain amplifier 32 via lead 74 and controls the gain of variable gain amplifier 32. It will be understood to those skilled in the art that the arrangement of this portion of the circuit, i.e., that in block 28, is such that when voltage appearing at output load terminal 20 is below the desired level of 120 V, the output of variable gain amplifier 32 is increased to restore output terminal 20 to the desired voltage level, i.e., 120 volts.

It will be understood to those skilled in the art, that what has thus far been described may be characterized as a so-called "line conditioner". A line conditioner essentially processes utility AC power by filtering and regulating it. As for example, a desired regulation regimen would be as the utility voltage varies from +13% to −20% of 120 V or nominal, the output load terminals (20, 22), as a result of the line conditioner, would remain within a nominal ±3 to 5% of its desired range.

The battery boost circuit 13 will now be described to complete the description of the UPS system shown in FIG. 1. The +DC voltage appearing across capacitor C1 is scaled by scaling means or resistors R3 and R4 and the voltage at point 76, which is proportional to the voltage across capacitor Cl, is applied to an input of error amplifier 78. The other input of error amplifier 78 has voltage reference $V_{REF-1}$ applied thereto which is generated by voltage generating means 124. $V_{REF-1}$ is a voltage signal representative of a second desired voltage level, i.e. 95 V for the lower limit of the utility power source. The voltage at point 76 is compared to $V_{REF-1}$ in error amplifier 78 and the error amplifier 78 provides a error signal at its output representative of the difference or error between $V_{REF-1}$ and the voltage at point 76. The resultant error signal appearing on the output of error amplifier 78 is fed to one input of a pulse width modulation means or comparator 80 via lead 82. The other input of comparator 80 has applied there a signal having a triangular waveform, generated by reference wave form generating means 84, having a desired carrier frequency i.e. the frequency at which suitable switching element 86 is to be switched from one state to another. The comparator 80, like the comparator 44, provides a PWM waveform switching signal on its output in the form of a pulse train wherein the duration of each pulse train is controlled by error signal, however, when the +DC voltage is at or above the desired +DC level no PWM signal appears on the output of comparator 80. When the +DC voltage level falls below the desired level, sufficient error signal is generated by error amplifier 78 which when applied to comparator 80 effects a PWM output signal from comparator 80. The output of comparator 80 is coupled to switching element 86 via lead 88 and the output of comparator 80 drives switching element 86. A PWM signal appearing on the output of comparator 80 turns switching element 86 on. When switching element 86 is on current flows from battery 90 into high frequency coupled inductor 92. As will be understood to those skilled in the art, the energy stored in inductor 92 will be discharged into the capacitors C1 and C2 via dump diodes 94 and 96, respectively, when switch 86 opens and that by controlling the amount of energy stored in the inductor 92 the +DC and −DC voltages can be maintained at the desired level.

From the foregoing it will be understood to those skilled in the art that the battery boost circuit produces A +DC voltage across capacitor C1 and a −DC voltage across capacitor C2 during emergency conditions wherein the voltage of the alternating-current utility power source falls below a second desired level, i.e. 95 V.

Although a particular embodiment of the invention has been described and illustrated herein, it is recognized that modifications and variations may readily occur to those skilled in the art and consequently, it is intended that the claims be interpreted to cover such modifications and equivalents.

What is claimed:

1. An uninterrupted power supply system comprising:
   rectifier means for effecting rectification of alternating-current utility voltage to obtain direct current voltage, said rectifier means having a first input terminal for connection to the ungrounded conductor of an alternating-current utility power source and a second input terminal for connection to the grounded conductor of said alternating-current utility power source;
   a pair of load terminals for connection to a load, said second input terminal of said rectifier means being connected to one of said pair of load terminals by an electrical conductor whose electrical continuity is maintained from said second input terminal of said rectifier means to said one of said pair of load terminals and without any isolation means being disposed between said second input terminal and said one of said pair of load terminals;
   inverter means for conversion of said direct-current voltage produced by said rectifier means to alternating-current voltage and for maintaining the level of said alternating-current voltage across said pair of load terminals in a desired range under normal conditions wherein the voltage of said alternating-current utility power source is in a predetermined range above or below a desired level;
   said rectifier means further including:
   first and second output terminals,
   a first capacitor connected between said first output terminal and said electrical conductor; and
   a second capacitor connected between said second output terminal and said electrical conductor,
   said rectifier means producing rectified line +DC voltage across said first capacitor and producing rectified line −DC voltage across said second capacitor when said first and second input terminals of said rectifier means are connected, respectively, to the ungrounded conductor and grounded conductor of said alternating-current utility power source;
   battery means, and
   battery boost circuit means coupled to said battery means and to said first and second capacitors for producing a +DC voltage across said first capacitor and a −DC voltage across said second capacitor during emergency conditions wherein the voltage of said alternating-current utility power source falls below a second desired voltage level.

2. An uninterrupted power supply system according to claim 1 wherein said battery boost circuit means comprises:
   scaling means operatively connected across said first capacitor and between said first output terminal of said rectifier means and said electrical conductor for providing a signal proportional to the voltage across said first capacitor;

generating means for generating a signal representative of said second desired voltage level;

error signal generating means operatively connected to said generating means and to said scaling means for generating an error signal representative of the difference between said signal proportional to the voltage across said first capacitor and said signal representative of said second desired voltage level;

reference waveform-generating means for generating a reference signal having a triangular waveform of a desired frequency;

high frequency coupled inductor means operatively connected to said battery means and to said first and second capacitors;

switching means operatively connected between said high frequency coupled inductor means and said battery means; and pulse width modulation means having a first input coupled to said reference waveform-generating means, a second input and an output, said error signal generating means coupled to said second input of said pulse width modulation means to apply said error signal thereto, said pulse width modulation means generating a switching signal on its output in the form of a pulse train wherein the duration of each pulse thereof is controlled by said error signal, said output of said pulse width modulation means being coupled to said switching means for closing said switching means when the voltage across said first capacitor falls below said second desired level thereby permitting current to flow from said battery means into said inductor and for opening said switching means to thereby permit said inductor to discharge into said first and second capacitors.

3. An uninterrupted power supply system according to claim 2, wherein said scaling means comprises a pair of series connected resistors and said error signal generating means comprises an error amplifier having a first input coupled to the junction of said pair of series connected resistors, a second input coupled to said generating means and an output; said signal proportional to the voltage across said first capacitor is a voltage signal and said signal representative of said second desired voltage level is a reference voltage signal.

4. An uninterrupted power supply system according to claim 1 wherein said inverter means comprises:

first switching means having a first terminal and a second terminal, said second terminal coupled to said first output terminal of said rectifier means;

second switching means having a first terminal and a second terminal, said second terminal of said second switching means coupled to said second output terminal of said rectifier means, said first terminal of said second switching means coupled to the first terminal of said first switching means;

filtering means comprising:
(i) inductor means coupled to the first terminals of said first and second switching means and to the other of said pair of load terminals, and
(ii) a filter capacitor coupled to said inductor means and across said pair of load terminals;

a control circuit coupled to the other one of said pair of load terminals and to said first and second switching means for effecting the opening and closing of said first and second switching means whereby to convert said direct current voltage produced by said rectifier means to alternating current voltage across said pair of load terminals.

5. An uninterrupted power supply according to claim 4 wherein said control circuit includes:

a sine wave generator for producing a sinusoidal reference voltage waveform representative of a desired voltage waveform;

a variable gain amplifier for generating a voltage signal representative of the voltage appearing at said other of said pair of load terminals, said variable gain amplifier having an input coupled to said sine wave generator and an output;

an error signal generating means having a first input coupled to said other of said pair of load terminals for deriving a voltage signal proportional to the voltage appearing at said other of said pair of load terminals, a second input coupled to said output of said variable gain amplifier and an output; said error signal generating means producing an error voltage signal on its output representative of the difference between said voltage signal representative of the voltage appearing at said other of said pair of load terminals and said voltage signal proportional to the voltage appearing at said other of said pair of load terminals, reference waveform-generating means for generating a reference signal having a triangular waveform of a desired frequency;

pulse width modulation means having a first input coupled to said output of said error signal generating means, a second input coupled to said reference waveform-generating means, and an output;

first driver means having an input, and an output coupled to said first switching means;

a NOT device having an input, and an output;

second driver means having an input coupled to said output of said NOT device, and an output coupled to said second switching device, said pulse width modulation means generating a switching signal on its output in the form of a pulse train wherein the duration of each pulse thereof is controlled by said error voltage signal, said output of said pulse width modulation means coupled to said input of said first driver means and said input of said NOT device whereby said first and second switching means are alternately opened and closed according to the presence or absence of a switching signal on said output of said pulse width modulation means.

6. An uninterrupted power supply system according to claim 5 wherein said control circuit further includes:

full wave rectifier means having an input coupled to said other of said pair of load terminals for effecting rectification of the alternating current-voltage appearing across said pair of load terminals, and an output;

averaging means comprising:
(i) a resistor coupled to the output of said full wave rectifier, and
(ii) a capacitor coupled to said resistor and to said one of said pair of load terminals; said averaging means averaging the output of said full-wave rectifier and producing a voltage signal representative of the voltage appearing at said other of said pair of load terminals;

generating means for generating a voltage reference signal proportional to a desired voltage level;

a second resistor having a first terminal coupled to both said resistor and capacitor, and a second terminal;

error signal generating means having a first input coupled to the second terminal of said second resistor, a second input coupled to said generating means, and an output; said error signal generating means producing a error voltage signal on its output representative of the difference between said signal proportional to said desired voltage level and said voltage signal representative of the voltage appearing at said other of said pair of load terminals;

said output of said error signal generating means coupled to said variable gain amplifier for controlling and varying the gain of said variable gain amplifier whereby the alternating-current voltage across said pair of load terminals is substantially maintained at said desired level.

* * * * *